(12) United States Patent
Velazquez (10) Patent No.: US 7,168,804 B2
(45) Date of Patent: Jan. 30, 2007

(54) VISION SYSTEM AND METHOD FOR OBSERVING USE OF A PRODUCT BY A CONSUMER

(75) Inventor: Herb F. Velazquez, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 205 days.

(21) Appl. No.: 10/435,413

(22) Filed: May 9, 2003

(65) Prior Publication Data

US 2004/0212778 A1    Oct. 28, 2004

Related U.S. Application Data

(60) Provisional application No. 60/465,327, filed on Apr. 24, 2003.

(51) Int. Cl.
*G02C 1/00* (2006.01)

(52) U.S. Cl. .......................................... 351/158; 351/41

(58) Field of Classification Search ................ 351/158, 351/41; 345/7, 8; 348/14.01, 158
See application file for complete search history.

(56) References Cited

U.S. PATENT DOCUMENTS

| | | | |
|---|---|---|---|
| H1790 H * | 3/1999 | Coleman | 348/14.01 |
| 5,886,739 A * | 3/1999 | Winningstad | 348/158 |
| 6,046,712 A * | 4/2000 | Beller et al. | 345/8 |
| 6,057,966 A * | 5/2000 | Carroll et al. | 359/630 |
| 6,101,916 A * | 8/2000 | Panot et al. | 89/1.13 |
| 6,560,029 B1 * | 5/2003 | Dobbie et al. | 359/631 |
| 6,563,532 B1 * | 5/2003 | Strub et al. | 348/158 |
| 6,717,737 B1 * | 4/2004 | Haglund | 359/631 |

* cited by examiner

*Primary Examiner*—Hung Xuan Dang
(74) *Attorney, Agent, or Firm*—Schwegman, Lundberg, Woessner & Kluth, P.A.

(57) ABSTRACT

A vision system and method for use by a consumer. The vision system includes an article (e.g., glasses) that is worn by the consumer and a camera attached to the article. The vision system further includes a microphone attached to the article. In another aspect, the vision system includes an article worn by the consumer and a camera attached to the article. The camera may be manually and/or automatically adjustable relative to said article to modify the view as seen by the camera. The method includes affixing a camera to an article (e.g., glasses) that are worn by the consumer; adjusting the camera relative to the article to modify the view of the activity as seen by the camera; and recording the performance of the activity by the consumer using the camera. In some forms, the method includes affixing a microphone to the article worn by the consumer.

18 Claims, 5 Drawing Sheets

VISION SYSTEM AND METHOD FOR OBSERVING USE OF A PRODUCT BY A CONSUMER

CROSS-REFERENCE TO RELATED APPLICATION

This application claims priority under 35 U.S.C. 119(e) from U.S. Provisional Application Ser. No. 60/465,327 filed Apr. 24, 2003, which application is incorporated herein by reference.

BACKGROUND

There are many benefits that can be derived from obtaining consumer-related information, such as ethnographic information, from consumers. Some example uses of consumer-related information include developing new product features and validating new product concepts. Consumer-related information is also valuable in developing new products and determining potential new markets that address consumer preferences. Other benefits include using the information to improve product ergonomics, usability and document consumer routines (among other applications).

One difficulty associated with obtaining information from consumers is that while consumers provide information as to what they know and remember, they are often not aware of some events or they forgot to pass along important information. Researchers typically address this difficulty by video recording consumers using products. The video recordings are studied by researchers to obtain useful data.

A consumer is usually recorded by positioning one or more cameras within an area and having the consumer utilize the product within that area. One drawback with recording consumers in this manner is that the recordings typically fail to provide a perspective from the consumer's point of view. Another potential drawback is that the systems and methods often fail to capture any sounds (e.g., comments made by the consumer) which are associated with the consumer using the product.

Another drawback with conventional consumer recording techniques is that the consumer typically utilizes the product in a fabricated environment instead of an environment where the product is normally used (e.g., a home). Consumers may use products differently in a fabricated environment versus a natural environment. Therefore, recording a consumer in an unnatural environment may result in obtaining less accurate information.

There is a need for a system and/or a method that obtains information from consumers relating to the use of products in a natural environment. The system and method should be able to audibly and visually document a consumer's use of a product from the consumer's perspective to obtain valuable ethnographic information which can be used to develop improved products.

SUMMARY OF THE INVENTION

The present invention relates to a vision system and method. The vision system and method document consumer-related information that can be used to enhance product usability and develop new product features.

In one aspect, the present invention relates to a vision system for use by an individual. The vision system includes an article worn by the individual and a camera attached to the article. The vision system further includes a microphone attached to the article.

The vision system may further include a display that receives signals from the camera and a speaker that receives signals from the microphone. In some sample forms, the article is a pin that is secured to clothing of the individual, or a headband (or cap) that is worn by the individual. In other forms, the article is glasses and the camera and microphone are clipped onto, or integral with, the glasses.

In another aspect, the present invention relates to a vision system for use by an individual that includes an article worn by the individual and a camera attached to the article. The camera may be manually and/or automatically adjustable relative to said article to modify the view as seen by the camera. The system may further include a control that sends signals to the camera which cause automatic adjustment of the camera relative to the article.

In still another aspect, the present invention relates to a vision system for use by a consumer. The vision system includes glasses worn by the consumer and a microphone and camera (e.g., a digital camera) that are attached to the glasses. In some forms, the camera and microphone are integral with the glasses while in other forms the camera and microphone are clipped onto the glasses.

The vision system may further include a recorder that records signals (wired or wireless signals) from the camera and the microphone. The vision system may also include an apparatus that is worn by the consumer to hold the recorder.

In yet another aspect, the present invention relates to a method of observing an activity performed by an individual. The method includes affixing a camera to an article worn by the individual; affixing a microphone to the article worn by the individual; and recording the performance of the activity by the individual using the microphone and the camera. The method may further include preparing instructions on how to use the article, camera and microphone and/or training the individual on how to use the article, camera and microphone.

In another aspect, the method includes affixing a camera to an article worn by the individual; adjusting the camera relative to the article to modify the view of the activity as seen by the camera; and recording the performance of the activity by the individual using the camera. Adjusting the camera relative to the article may include manually and/or automatically adjusting the camera relative to the article. In addition, adjusting the camera relative to the article may include sending signals (e.g., wireless signals) from a control to the camera.

In still another aspect, the present invention relates to a method of observing use of a product by a consumer. The method includes affixing a camera to an article worn by a consumer; affixing a microphone to the article worn by the consumer; and recording the use of the product by the consumer using the camera in a home environment, such as the consumer's home.

In another aspect, the method includes affixing a camera to glasses that are adapted to be worn by the consumer and recording the use of the product by the consumer using the camera. The method may further include (i) affixing a microphone to the glasses that are adapted to be worn by the consumer; (ii) supplying the consumer with the product; and/or (iii) adjusting the camera (manually or automatically) relative to the glasses to modify the view as seen by the camera of the consumer using the product.

In some sample forms of the method, recording the use of the product by the consumer using the microphone and the camera includes obtaining ethnographic information relating to use of the product by the consumer. In addition, affixing a camera to glasses that are adapted to by worn the consumer may include clipping the camera onto the glasses.

In still another aspect, the present invention relates to a method of observing consumer shopping. The method includes affixing a camera to an article worn by a consumer; affixing a microphone to the article worn by the consumer; and recording the consumer shopping using the microphone and the camera.

The method may further include adjusting the camera relative to the article to modify the view as seen by the camera. In addition, affixing a camera to an article worn by a consumer may include affixing a camera to glasses worn by the consumer.

The purposes and features of the present invention will be set forth in the description that follows. Additional features of the invention will be realized and attained by the product and processes particularly pointed out in the written description and claims hereof, as well as from the appended drawings.

It is to be understood that both the foregoing general description and the following detailed description are exemplary and are intended to provide further explanation of the invention claimed. The accompanying drawings, which are incorporated in and constitute part of this specification, are included to illustrate and provide a further understanding of the invention.

BRIEF DESCRIPTION OF THE DRAWINGS

The present invention will be more fully understood, and further features will become apparent, when reference is made to the following detailed description and the accompanying drawings. The drawings are merely representative and are not intended to limit the scope of the claims. Like parts depicted in the drawings are referred to by the same reference numerals.

DETAILED DESCRIPTION

In the following detailed description, reference is made to the accompanying drawings, which show specific embodiments in which the invention may be practiced. These embodiments are described in sufficient detail to enable those skilled in the art to practice the invention. It is to be understood that other embodiments may be utilized and structural changes made, such that the following detailed description is not to be taken in a limiting sense.

Figure 1:
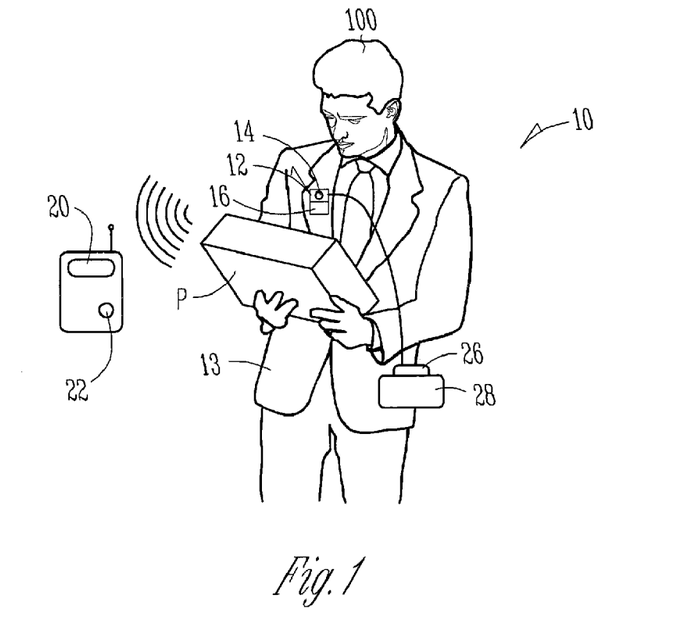
FIG. 1 illustrates a vision system and method.

FIG. 1 shows a vision system 10 for use by an individual 100. The vision system 10 includes an article 12 worn by the individual 100 and a camera 14 attached to the article 12. The vision system 10 further includes a microphone 16 that is attached to the article 12. In some forms of the vision system 10, the camera 14 and the microphone 16 are integral with the article 12. The camera 14 and microphone 16 may be any conventional type of camera or microphone, including digital cameras and microphones. In addition, the camera 14 and/or microphone 16 may be developed to work with a particular article.

As shown in FIG. 1, the vision system 10 may further include a display 20 that receives signals from the camera 14 and a speaker 22 that receives signals from the microphone 16. In the illustrated example form of the vision system 10, the speaker 22 is integral with the display 20. The speaker 22 and/or display 20 may be hardwired to the microphone 16 and/or camera 14, or as shown in FIG. 1, adapted to receive wireless signals from the microphone 16 and/or camera 14. The display 20 and speaker 22 may be any conventional type of display or speaker, including digital displays and speakers that are customized to work with a particular article.

The vision system 10 may further include a recorder 26 that records signals from the camera 14 and/or the microphone 16. Although the recorder 26 is shown as being hardwired to the article 12, the recorder may receive wireless signals from the microphone 16 and/or camera 14. In some forms, the vision system 10 may also include an apparatus, such as pack 28, that is worn by the individual 100 and is adapted to secure the recorder 26. Pack 28 may be a "Fanny Pack" type carrier that is worn around the individual's waist.

It should be noted that any type of apparatus may be used to secure the recorder 26 somewhere on the individual 100. In addition, the recorder 26 may be incorporated directly, or indirectly, with the display 20 and the speaker 22 such that the recorder 26 receives the common signal with the display 20 and the speaker 22.

Although any conventional type of conventional recorder may be used in the vision system 10, the recorder 26 may be developed to work with a particular article, camera, microphone, speaker and/or display. In addition, the recorder may record information in any form (e.g., digital information) on any type of medium.

The vision system 10 may further include a power supply (not shown). In some forms, the power supply may be held within pack 28. When the parts of the vision system 10 are hardwired together, the power supply may provide power to one or more components in the vision system 10 through the same or separate cabling that sends and receives respective signals to each part of the vision system 10.

Figure 7:
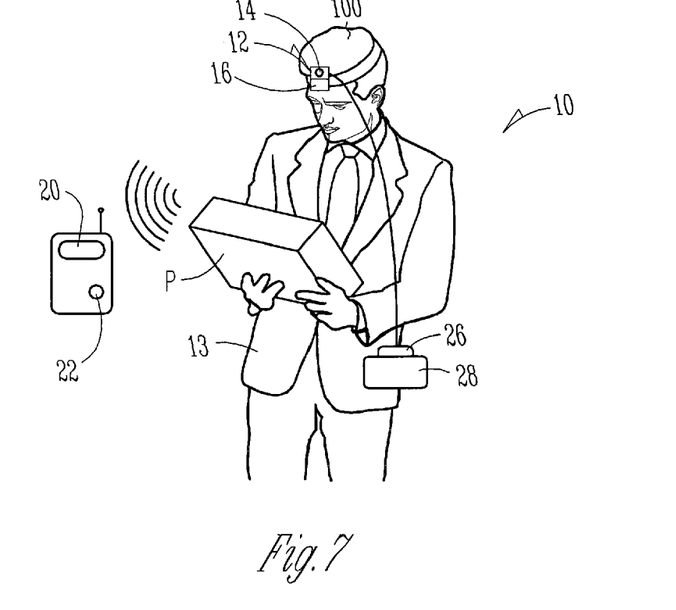
FIG. 7 illustrates still another example vision system and method.
Figure 8:
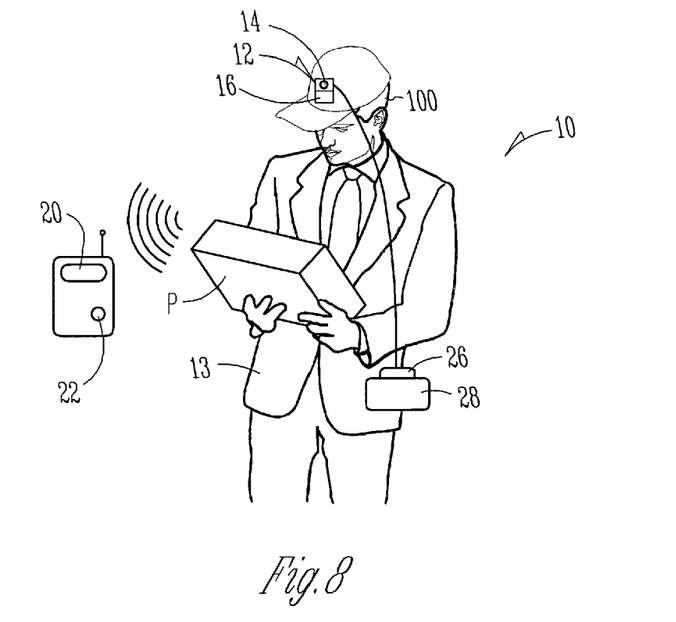
FIG. 8 illustrates yet another example vision system and method.

The type of article 12 that is used in the vision system 10 depends on the application where the vision system 10 is used. Although FIG. 1 shows article 12 as a pin that is adapted to be secured to clothing 13 which is worn by the individual 100, it should be noted that the article 12 may be a headband, (see, e.g., FIG. 7), cap, (see, e.g., FIG. 8), wristband, belt or glasses (see, e.g., FIGS. 4–6) that are adapted to be worn by the individual 100 (among other items that can be attached to, or worn by, an individual).

Figure 2:
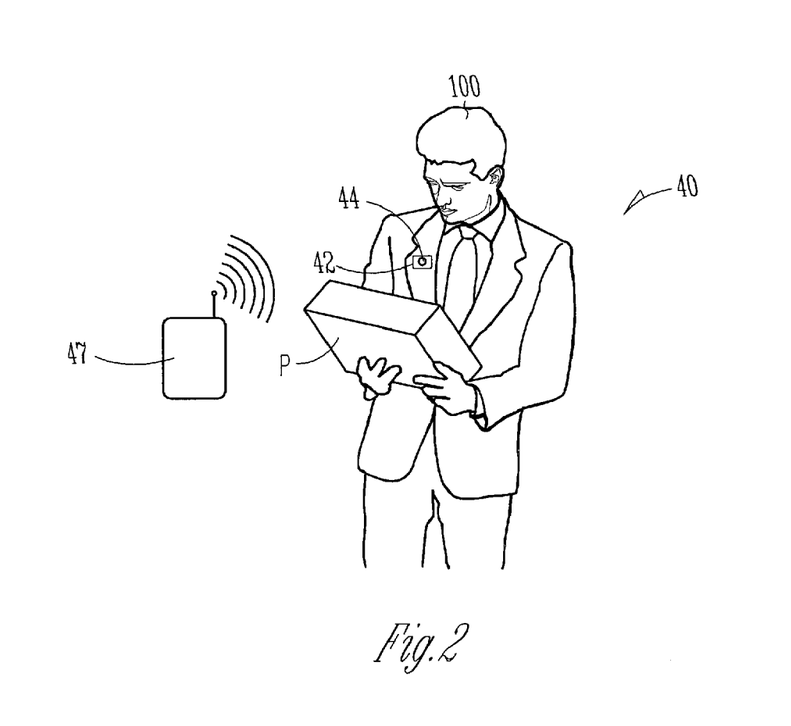
FIG. 2 illustrates another vision system and method.

FIG. 2 shows another example vision system 40 for use by an individual 100. The vision system 40 includes an article 42 that is worn by the individual 100 and a camera 44 that is attached to the article 12. As shown most clearly in FIG. 3, the camera 44 is adjustable relative to the article 42 to modify the view as seen by the camera 44. Camera 44 may be of any conventional type, including a digital camera that is developed to work with a particular article. In the illustrated example vision system 40, camera 44 is integral with the article 42, although the camera 44 and article 42 may also be separate items that are joined together in any manner.

It should be noted that the camera 44 may be manually or automatically adjustable relative to the article 42. In addition, the vision system 40 may include a control 47 that automatically adjusts the camera 44 relative to the article 42. The camera 44 may be hardwired to the control 47, or as shown in FIG. 2, the camera 44 may be adapted to receive wireless signals from the control 47. The control may be any conventional type of control, or a customized control that is adapted to work with a particular article and/or camera.

Figure 3:
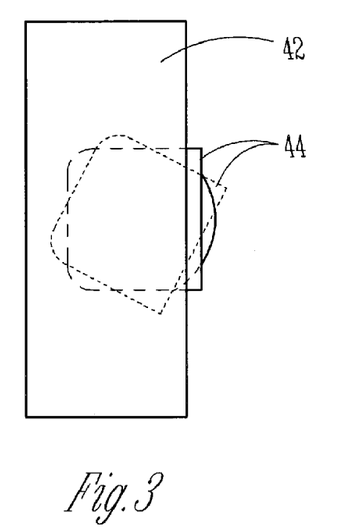
FIG. 3 illustrates an article that may be used in the vision system and method shown in FIG. 2.

The vision system 40 may further include a locking mechanism (not shown) that secures the camera 44 in more than one position/orientation relative to the article 42. The locking mechanism may be incorporated into one or more of the article 42, camera 44 and control 47.

It should be noted that the vision system 40 may also include one or more of a display, speaker, recorder and apparatus as described above with reference to FIG. 1. In addition, the type of article 42 that is used in the vision system 40 will similarly depend on the application where the vision system 40 is used.

Figure 4:
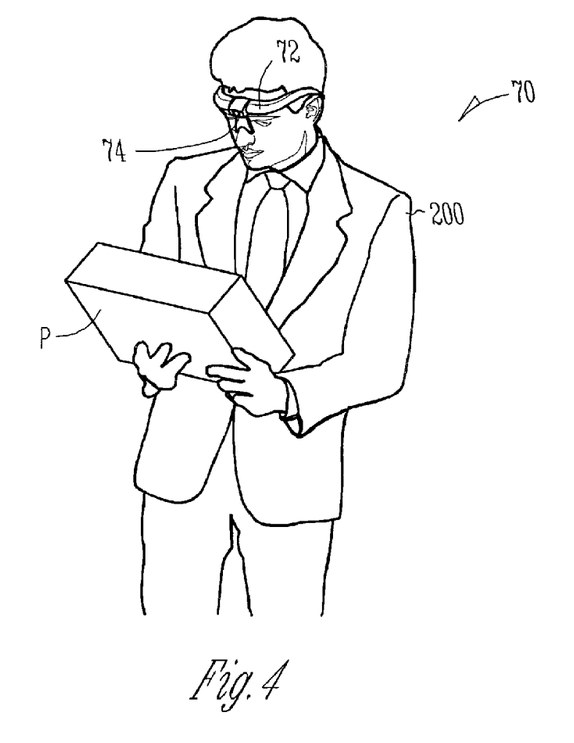
FIG. 4 illustrates another vision system and method.
Figure 5:
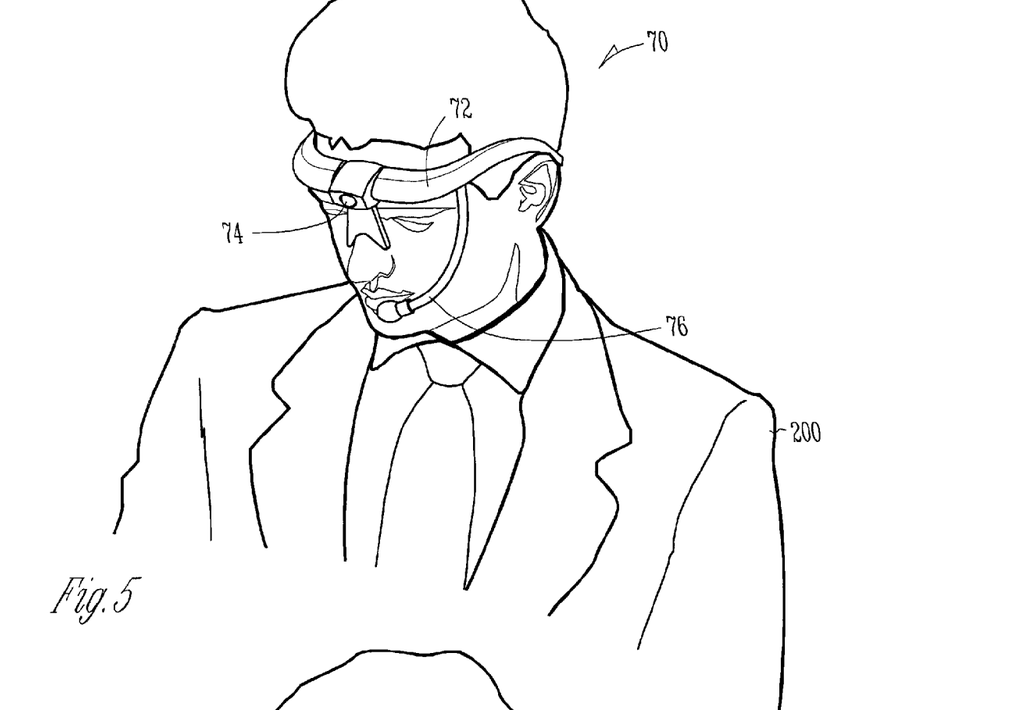
FIG. 5 is an enlarged view of FIG. 4 illustrating in greater detail a pair of glasses that may be used in the vision system and method shown in FIG. 4.
Figure 6:
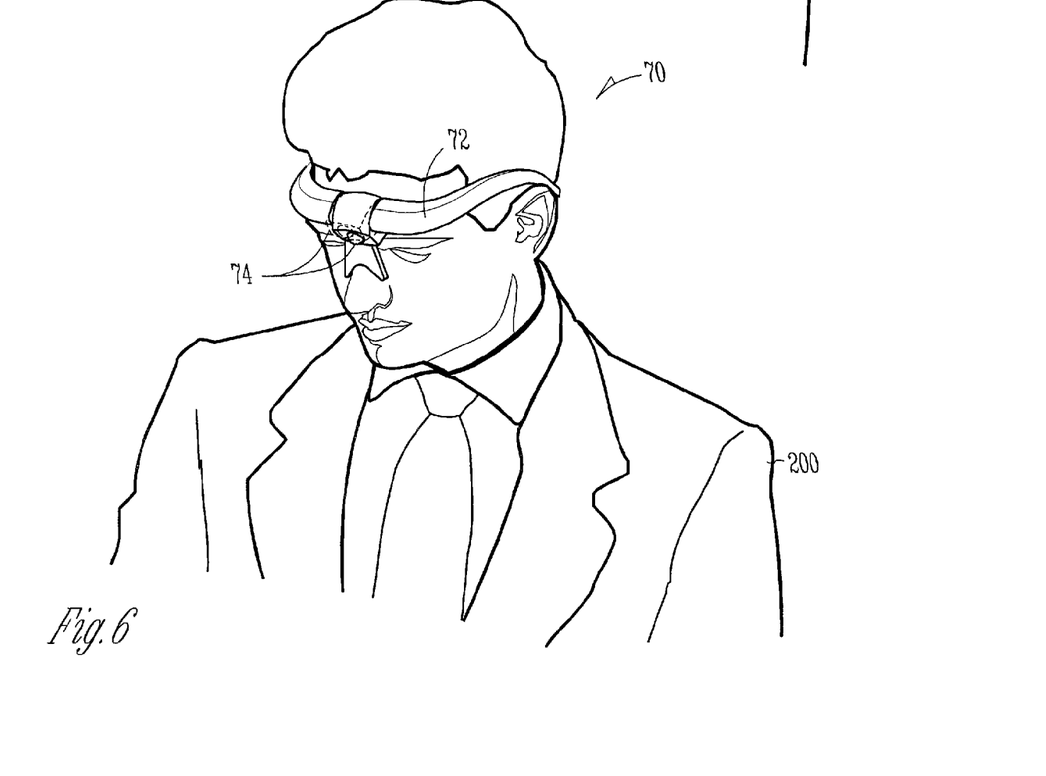
FIG. 6 is an enlarged view similar to FIG. 5 illustrating another pair of glasses that may be used in the vision system and method shown in FIG. 4.

FIGS. 4–6 show a vision system 70 for use by an individual, such as a consumer 200. The vision system 70 includes a pair of glasses 72 that are worn by the consumer 200 and a camera 74 which is attached to the glasses 72. Alternative forms of the vision system 70 are shown in FIG. 5 versus FIGS. 4 and 6.

FIG. 5 shows a form of the vision system 70 that further includes a microphone 76 which is attached to the glasses 72. The microphone 76 may be in a variety sizes, shapes and forms such that the style of microphone 76 illustrated in FIG. 5 is only for illustrative purposes.

FIGS. 4 and 6 show a form of the vision system 70 that does not include a microphone but the camera 74 is adjustable relative to the glasses 72. The camera 74 may be manually or automatically adjustable relative to the glasses 72. In addition, the vision system 70 may further include a control that automatically adjusts the camera 74 relative to the article 72 to change the view as seen by the camera 74 (see, e.g., control 47 in FIG. 2). In other forms, the vision system 70 will include (i) a microphone 76; and (ii) a camera 74 that is adjustable relative to the glasses 72.

The camera 74 and/or microphone 76 may be integral with the glasses 72, or clipped onto the glasses 72. In addition, the camera 74 and/or microphone 76 may be of any conventional type, or the camera and/or microphone may be developed to work with a particular style of glasses. The vision system 70 may also include one or more of a display, speaker, locking mechanism, power supply, recorder and apparatus as described above with reference to FIGS. 1–3.

It should be noted that glasses 72 may take a variety sizes, shapes and forms such that the style of glasses 72 illustrated in FIGS. 4–6 are only for illustrative purposes. As an example, the glasses 72 may be fabricated to fit an exact head size (adult/child).

A method of observing an activity performed by an individual 100 is described herein with reference to FIGS. 1–6. As used herein, individual 100 and consumer 200 are sometimes used interchangeably in the described methods depending on the context of the method. The method includes affixing a camera 14 to an article 12 worn by the individual 100; affixing a microphone 16 to the article 12 worn by the individual 100; and recording the performance of the activity by the individual using the microphone 16 and the camera 14 (see, e.g., FIG. 1).

It should be noted recording the performance of the activity by the individual may include any type of activity. Some example activities include a consumer using and/or shopping for a product and a laborer performing work-related operations. Other example activities include providing live or recorded feedback to an instructor.

The method may further include (i) preparing instructions on how to use the article 12, camera 14 and microphone 16; (ii) training the individual 100 on how to use the article 12, camera 14 and microphone 16; (iii) obtaining information from the individual 100 relating to recording the performance of the activity using the article 12; and/or (iv) training other individuals to perform the same activity using information obtained from recording the performance of the activity by the individual 100.

Preparing instructions on how to use the article 12, camera 14 and microphone 16 may include preparing instructions for all aspects of using the vision system, including putting the vision system on, starting and ending the recording process, changing video cassettes or other medium, and for calling someone if there is a problem. As an example, one or more of the components that are used in the system may include stickers which are placed on all elements/buttons/switches of the equipment to label the parts of the equipment that a user will have to interact with.

In some sample forms of the method, affixing the camera 14 and the microphone 16 to the article 12 worn by the individual 100 and/or recording the performance of the activity by the individual 100 includes utilizing the instructions on how to use the article 12, camera 14 and microphone 16.

Training consumers/users on how to use the article 12, camera 14 and microphone 16 may include bringing the consumers/users to a training facility to receive instruction on using the vision system. The consumer/user then takes the vision system with them to record at some other location. Once the consumer/user has completed the recording, the vision system is returned to the facility at which point the consumer/user may be debriefed to provide feedback relating to use of the vision system.

Training could also be done in an environment where an individual normally performs an activity, such as a home. The nature of the training will depend on the application but may include demonstrations of all aspects of using the system.

It should be noted that recording the performance of the activity by the individual 100 using the microphone and the camera may include adjusting the camera relative to the article (see, e.g. FIGS. 2 and 3). In addition, affixing a camera 14 and a microphone 16 to an article 12 worn by the individual 100 may include affixing the camera 14 and the microphone 16 to any one of a headband, cap, pin and glasses (see e.g., FIGS. 4–6) that are adapted to be worn by an individual 100.

The type of article 12 that is used in the method depends on the application where the article 12 is used. Although FIG. 1 shows article 12 as a pin that is adapted to be secured to clothing 13 worn by the individual 100, it should be noted that the article 12 may be (among other items) a headband, cap, wristband, belt or glasses (see, e.g., FIGS. 4–6) that are adapted to be worn by, or attached to, the individual 100.

Another example method of observing an activity performed by an individual is described herein with reference to FIGS. 2–3. The method includes affixing a camera 44 to an article 42 that is worn by the individual 100; adjusting the camera 44 relative to the article 42 to modify the view of the activity as seen by the camera 44; and recording the performance of the activity by the individual 100 using the camera 44. It should be noted that adjusting the camera 44 relative to the article 42 may include (i) manually adjusting the camera 44 relative to the article 42; and/or (ii) automatically adjusting the camera 44 relative to the article 42 by sending signals from a control 47 to the camera 44.

A method of observing use of a product P by an individual 100 (FIGS. 1–3), such as a consumer 200 (FIGS. 4–6), is described herein with reference to FIGS. 1–6. The method includes affixing a camera 14 and a microphone 16 to an article 12 that is worn by the individual 100/consumer 200. The method further includes recording the use of the product P by the consumer 200 using the microphone 16 and the camera 14 to obtain ethnographic information relating to use of the product P (see, e.g., FIG. 1). Recording the use of the product P by the consumer 200 may include recording the consumer 200 shopping for a product.

Some ethnographic information obtained by this system may be used to perform time, effort and/or motion studies on an individual 100/consumer 200. Researchers can obtain additional information by analyzing a sequence of operations (e.g., task analysis) that are nominally associated with an individual performing an activity, such as using a product. This analysis may be used to enhance a product's usability or to develop brand new products.

Some other forms of ethnographic information that may be acquired include (i) documenting errors or mishaps associated with using a product; (ii) keeping a record of how consumers customize a product and/or the environment when the consumer uses the product; and (iii) observing an individual/consumer's behavior as they use the product.

In some forms, obtaining ethnographic information includes performing studies that examine design changes which have been made based on ethnographic information from earlier studies. This type of ethnographic information is helpful in validating design changes or new product designs.

It should be noted that many different types of analysis may be done using the ethnographic information obtained by the system, including behavioral, psychological, physiological, and user-to product-to environment interaction analysis. Any of these types of analysis may be used to develop improved and/or new products (among other applications).

The method may further include (i) supplying the consumer 200 with the product P; and/or (ii) obtaining information from the consumer 200 relating to recording the use of the product P using the microphone 16 and the camera 14. In addition, recording the use of the product P using the microphone 16 and the camera 14 may include recording the consumer 200 in an environment where the consumer 200 normally uses the product (e.g. a home).

Another method of observing use of a product P by a consumer 200 is described herein with reference to FIGS. 4–6. The method includes affixing a camera 74 to glasses 72 that are adapted to by worn the consumer 200 and recording the use of the product P by the consumer 200 using the camera 74 in a home environment, such as the consumer's home.

The method may further include (i) affixing a microphone 76 to the glasses 72 that are adapted to be worn by the consumer 200; (ii) supplying the consumer 200 with the product P; and (iii) manually and/or automatically adjusting the camera 74 relative to the glasses 72 to modify the view of the consumer 200 using the product P.

Figure 9:
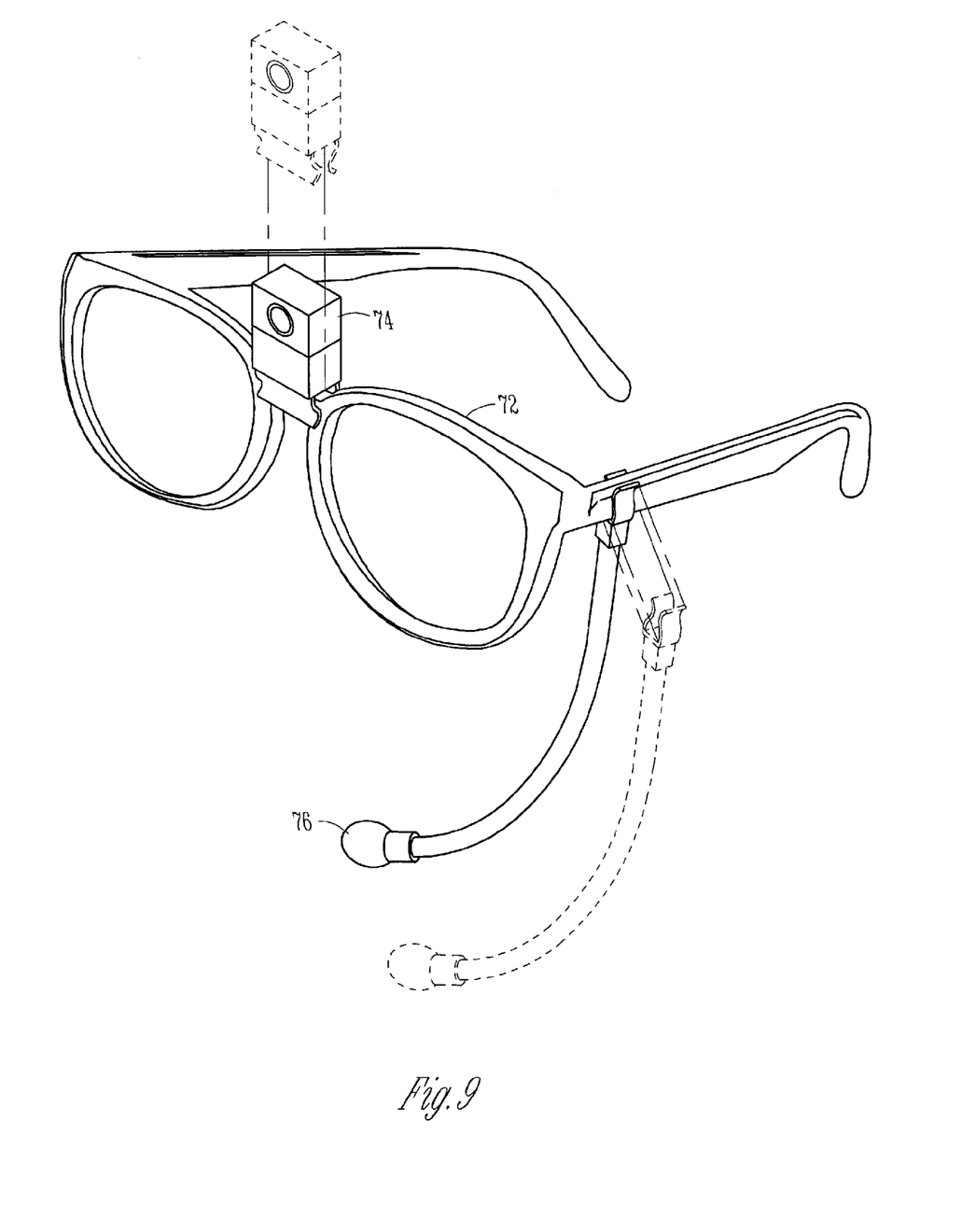
FIG. 9 is a perspective view of another pair of glasses that may be used in the vision system and method where a camera is clipped onto the glasses.

In some forms of the method, recording the use of the product P by the consumer 200 using the camera 74 includes obtaining ethnographic information relating to use of the product P by the consumer 200. In addition, affixing the camera 74 to the glasses 72 that are adapted to by worn the consumer 200 may include clipping the camera 74 (and possibly a microphone 76) onto the glasses 72 (see, e.g., microphone 76, camera 74 and glasses 72 in FIG. 9).

In another aspect, a method of observing a consumer shopping is described herein with reference to FIGS. 1–6. The method includes affixing a camera 14 and a microphone 16 to an article 12 worn by an individual 100/consumer 200 (see, e.g., FIG. 1). The method further includes recording the consumer shopping using the microphone 16 and the camera 14.

As shown in FIGS. 2 and 3, the method may further include adjusting a camera 44 relative to the article 42 to modify the view as seen by the camera 44. In addition, affixing a camera 74 to an article worn by a consumer 200 may include affixing a camera 74 to glasses 72 worn by the consumer 200 (see, e.g., FIGS. 4–6).

The method may also include obtaining ethnographic information associated with a consumer shopping for a product. As an example, such ethnographic information may be analyzed to (i) obtain time, effort and/or motion studies associated with handling a product during shopping; (ii) document the portions of a product's packaging the consumer reads; and (iii) observe a consumer's actions as they relate to choosing from multiple products. The insights developed can be used to improve packaging, package graphics and package placement to enhance package visibility, consumer appeal and purchase interest (among other applications).

The vision systems and methods described herein allow researchers to video record individuals engaged in activities, such as consumers using products, within the correct environmental context. Future developments in technology are foreseen in which all components continue to get smaller creating more opportunities to conceal them in glasses or other wearable elements such as hats, ties, buttons, pens, etc. In addition, researchers may be able to communicate with consumers/individuals in order to make adjustments to the method while the consumer/individual is in the process of performing the method.

The operations discussed above with respect to the described methods may be performed in a different order from those described herein. It should be noted that individual and consumer are sometime used interchangeably. In addition, FIGS. 1–6 are representational and are not necessarily drawn to scale. Certain proportions thereof may be exaggerated, while others may be minimized.

While the invention has been described in detail with respect to the specific aspects thereof, it will be appreciated that those skilled in the art, upon attaining an understanding of the foregoing, may readily conceive of alterations to, variations of, and equivalents to these aspects which fall within the spirit and scope of the present invention, which should be assessed accordingly to that of the appended claims.

I claim:

1. A vision system for use by an individual, the vision system comprising:
    an article worn by the individual, wherein said article is glasses that are adapted to be worn by the individual;
    a camera attached to said glasses; and
    a microphone attached to said glasses, wherein said camera and said microphone clip onto said glasses.

2. The vision system of claim 1 further comprising a display that receives signals from said camera.

3. The vision system of claim 2 further comprising a speaker that receives signals from said microphone.

4. The vision system of claim 3 wherein said speaker is integral with said display.

5. The vision system of claim 3 wherein said speaker receives wireless signals from said microphone and said display receives wireless signals from said camera.

6. The vision system of claim 1 further comprising a recorder that receives signals from said microphone and said camera.

7. The vision system of claim 6 further comprising an apparatus that is adapted to be worn by the individual, said recorder being attached to said apparatus.

8. The vision system of claim 1 wherein said camera is adjustable relative to said article.

9. A vision system for use by a consumer, the vision system comprising:
   glasses worn by the consumer;
   a camera attached to the glasses, wherein said camera is adjustable relative to said glasses;
   a microphone attached to the glasses, wherein said camera and said microphone clip onto said glasses;
   a recorder that records signals from said camera and said microphone, the signals providing ethnographic information relating to the consumer using a product; and
   an apparatus worn by the consumer, said recorder being attached to said apparatus.

10. The vision system of claim 9 further comprising a display that receives signals from said camera and a speaker that receives signals from said microphone.

11. The vision system of claim 9 wherein said recorder receives wireless signals from said microphone and said camera.

12. A method of observing an activity performed by an individual, the method comprising:
   affixing a camera to an article worn by the individual;
   affixing a microphone to the article worn by the individual, wherein affixing the camera and the microphone to the article worn by the individual includes clipping the camera and the microphone onto glasses; and
   recording the performance of the activity by the individual using the microphone and the camera.

13. The method of claim 12 further comprising preparing instructions on how to use the article, camera and microphone.

14. The method of claim 13 wherein affixing a camera to an article worn by the individual and affixing a microphone to the article worn by the individual includes utilizing the instructions on how to use the article, camera and microphone.

15. The method of claim 13 wherein recording the performance of the activity by the individual includes utilizing the instructions on how to use the article, camera and microphone.

16. The method of claim 12 further comprising training the individual on how to use the article, camera and microphone.

17. The method of claim 12 further comprising obtaining information from the individual relating to said recording the performance of the activity by the individual using the microphone and the camera.

18. The method of claim 12 further comprising training other individuals to perform the same activity using information obtained from said recording the performance of the activity by the individual using the microphone and the camera.

* * * * *